Patented Aug. 15, 1950

2,519,135

UNITED STATES PATENT OFFICE 2,519,135

POLYMERIZATION PROCESS

Ralph Albert Jacobson, deceased, late of Landenberg, New Garden Township, Chester County, Pa., by Winifred M. Jacobson, executrix, Landenberg, Pa., assignor to E. I. du Pont de Nemours and Company, Wilmington, Del., a corporation of Delaware No Drawing. Application June 4, 1948,
Serial No. 31,209

12 Claims. (Cl. 260—88.7)

This invention relates to the manufacture of polymers and more particularly to novel processes for the production of homopolymers and copolymers of monoethylenic monomers. More specifically it relates to a new and improved process for the polymerization of polymerizable monoethylenic vinylidene compounds having a molecular weight greater than 30, in which the sole aliphatic carbon-to-carbon unsaturation is the double bond in the vinylidene radical.

This application is a continuation-in-part of copending application Serial No. 458,734, filed September 17, 1942, now U. S. Patent 2,462,354.

Within recent years the plastics industry has utilized a wide variety of polymeric materials in the production or manufacture of a wide variety of valuable commercial articles. Rapid progress has been made on the important problem of developing improved techniques for the preparation of these polymers. Nevertheless, the polymerization of monoethylenic compounds and more particularly monoethylenic vinylidene compounds having a molecular weight greater than 30 in which the sole aliphatic carbon-to-carbon unsaturation is the double bond in the vinylidene or $H_2C=C=$ radical, is often a slow, uneconomical process which cannot be applied efficiently to manufacture on a large commercial scale. As a result, many polymers having attractive properties have been produced in the laboratory but have never been prepared commercially because of the lack of suitable methods for their production. Moreover, some of the most valuable polymers of this class are not homopolymers, i. e., made from a single monomeric component, but are rather copolymers produced by the copolymerization of two or more such polymerizable monomers. In this case the problem of obtaining satisfactory products is further complicated by difficulties in obtaining homogeneous products. For example, the copolymerization of different aforesaid vinylidene compounds with or without other monoethylenic compounds frequently proceeds at different rates; hence non-homogeneous copolymers of inferior quality as evidenced by opacity, low softening point or other undesirable qualities are obtained. This invention which provides a novel, efficient and practicable process for overcoming the difficulties attending known polymerization techniques accordingly represents an important advance in the art of producing polymers.

This invention has as an object the provision of an improved process for polymerizing polymerizable monoethylenic vinylidene compounds having a molecular weight greater than 30 in which the sole aliphatic carbon-to-carbon unsaturation is the double bond in the vinylidene radical, i. e., the $H_2C=C=$ radical. Another object is to provide an extremely rapid and controllable process for the polymerization of such compounds either alone or in admixture with other monoethylenic compounds. Additional objects will become apparent from an examination of the following description and claims.

These and other objects and advantages are accomplished according to the hereindescribed invention which broadly comprises forming an aqueous mixture containing one or more monoethylenic monomers having a molecular weight greater than 30 in which the sole aliphatic carbon-to-carbon unsaturation is the ethylenic double bond (at least 5% by weight of such monoethylenic monomeric material being a polymerizable vinylidene compound in which the sole aliphatic carbon-to-carbon unsaturation is the double bond in the vinylidene radical), said aqueous mixture containing from 0.01% to 5% of an oxygen-yielding polymerization catalyst and from 0.001% to 5% of a sulfinic acid or an alkali metal salt thereof, said percentage amounts being based upon the total weight of monoethylenic monomeric material present in the aqueous mixture, and maintaining the resultant aqueous system at a temperature of from 0° C. to 125° C. until polymerization has taken place.

In a more restricted sense this invention consists in subjecting one or more polymerizable monoethylenic monomeric vinylidene compounds having a molecular weight greater than 30 in which the sole aliphatic carbon-to-carbon unsaturation is the double bond in the vinylidene radical in an aqueous medium containing from 0.01% to 5% of an oxygen-yielding polymerization catalyst and from 0.001% to 5% of a sulfinic acid or an alkali metal salt thereof, based on the total weight of the vinylidene compound or compounds, to a temperature of from 0° C. to 125° C. until polymerization has taken place.

In one preferred embodiment of this invention a polymerizable monomeric monoethylenic vinylidene compound having a molecular weight greater than 30 in which the sole aliphatic carbon-to-carbon unsaturation is the double bond in the vinylidene radical, or a mixture of said vinylidene compounds containing at least 5% by weight of one such compound, is added to water containing from 0.1% to 2% of an oxygen-liberating catalyst such as hydrogen peroxide, benzoyl peroxide or a soluble salt of perdisulfuric acid, from 0.05% to 0.5% of a sulfinic acid or an alkali metal salt thereof, such as formamidine sulfinic acid, or sodium p-toluene sulfinate, and optionally from 1% to 5% of a suitable dispersing agent, the aforesaid percentage amounts being based upon the total weight of the vinylidene compound or compounds present in the aqueous medium and the whole being contained in a reaction vessel provided with means for effective agitation. The reaction vessel is closed, the air in the free space above the liquid is displaced by an inert gas such as nitrogen. The temperature of the reaction mixture is adjusted to an appropriate temperature between 0° C. and 125° C. and the reaction mixture is agitated. These conditions are maintained until polymerization is essentially complete, usually in the neighborhood of from one to five hours, or until polymerization has reached the desired extent. The reaction product is then discharged; the unreacted monomer, if any, is removed by steam distillation and the polymeric product is coagulated by adding a solution of electrolyte such as aluminum sulfate. The coagulated product is filtered, washed thoroughly to remove traces of impurities and residual dispersing agent and is finally dried.

The following examples in which proportions are in parts by weight, unless otherwise specified, are given for illustrative purposes and are not intended to place any restrictions on the herein-described invention:

Example I

A mixture of 10 parts of acrylonitrile and a solution of 0.1 part of ammonium perdisulfate and 0.02 part of sodium p-toluenesulfinate in 30 parts of water is charged into a reaction vessel which is then flushed with nitrogen to displace the air, closed and rotated end over end at a temperature of 29° C. Polymer first begins to separate after 8 minutes, and the polymerization is substantially complete after 143 minutes.

Example II

A stainless steel oscillating autoclave is charged with 50 parts of vinyl acetate and a solution in 150 parts of deoxidized water of 0.5 part of ammonium perdisulfate, 2 parts of a commercial dispersing agent containing about 32% of the sodium salt of sulfonated paraffin white oil as the active ingredient, 1 part of sodium dihydrogen phosphate and 0.1 part of formamidine sulfinic acid, the pH of this solution being adjusted to 6.4 with sodium bicarbonate. The vessel is flushed with nitrogen, sealed and pressured with propene gas to a pressure of 100 lbs. per square inch. The autoclave is then rocked in a water bath at 60° C. for 8 hours, after which the residual pressure is released and the contents of the vessel discharged. The reaction product is a smooth polymer emulsion which is treated with 0.5 part of hydroquinone to prevent further polymerization of any unreacted vinyl acetate. The pH of the mixture at this point is 5.4. The mixture is steamed to remove any unreacted monomer and coagulated hot by addition of aluminum sulfate solution. The polymer is milled on a wash mill with corrugated rolls under a stream of cool water until the dispersing agent is removed, sheeted out on the mill and the sheet cut up in fine pieces for drying. There is thus obtained 51.5 parts of a copolymer of vinyl acetate and propene.

Example III

Sixty parts methyl methacrylate is mixed with an aqueous solution consisting of 133.8 parts of water, 1.5 part of 30% hydrogen peroxide, 0.6 part of sodium p-toluenesulfinate, 0.38 part of concentrated hydrochloric acid and, as dispersing agents, 3.6 parts of technical sodium dodecyl sulfate and 0.45 part of the sodium salt of a sulfonated naphthalene-formaldehyde reaction product. The mixture is heated in a sealed vessel under nitrogen at 45° C. for 141 hours. After steaming, coagulating, filtering and drying, there are obtained 60 parts (100%) yield of light colored polymethyl methacrylate softening at 111° C.

Example IV

A solution of 0.25 part of ammonium perdisulfate and 0.125 part of formamidine sulfinic acid in 100 parts of water is adjusted to pH 2.5 by addition of dilute sulfuric acid, placed in a vessel and frozen by immersion in a carbon dioxide-acetone bath. The vessel is swept with nitrogen, 51.8 parts of vinyl chloride are added, the vessel is sealed, warmed to room temperature, then placed in a bath at 40° C. After 2 hours there are obtained 15.9 parts of polymerized vinyl chloride.

Example V

A mixture of 200 parts of vinyl acetate, 192 parts of water, 16 parts of polyvinyl alcohol and 0.2 part of formamidine sulfinic acid is stirred under reflux condenser at a temperature of 44° C., and 1.25 parts of 10% hydrogen peroxide are added in increments of 0.05 to 0.5 part over a period of 57 minutes. An additional 0.3 part of formamidine sulfinic acid is added during that time. Rapid polymerization is shown by the fact that the reaction temperature increases to 61° C. during the reaction. After 73 minutes, 97% of the vinyl acetate is polymerized. This compares to 4–6 hours necessary to complete polymerization when hydrogen peroxide alone is used as the catalyst.

While this invention has been illustrated with particular reference to the polymerization of acrylonitrile, methyl methacrylate, vinyl chloride, vinyl acetate and of a mixture of vinyl acetate and propene, it is to be understood that it is broadly applicable to the polymerization of any and all monomeric monoethylenic vinylidene compounds (i. e., compounds containing the terminal radical $H_2C=C=$) that are polymerizable, i. e., polymerizable according to one or more prior art processes (such as the process disclosed in U. S. Patent No. 2,278,415, granted April 7, 1942), that have a molecular weight greater than 30 and in which the sole aliphatic carbon-to-carbon unsaturation is the double bond in the vinylidene radical. In other words this invention is applicable to all polymerizable monoethylenic compounds having the ethylenic double bond in the terminal position, i. e., compounds containing a terminal methylene group, that have a molecular weight greater than 30 and in which the sole aliphatic carbon-to-carbon unsaturation is the double bond in the $H_2C=C=$ radical.

Representative compounds of this class are acrylic and methacrylic esters, acrylic and methacrylic acids, acrylonitrile, methacrylonitrile, acrylic and methacrylic amide, styrene, vinyl naphthalene, vinyl chloride, vinyl bromide, asymmetrical dichloroethylene, vinyl acetate and vinyl esters of higher carboxylic acids, methyl vinyl ketone, phenyl vinyl ketone, methyl isopropenyl ketone, methylenemalonic esters, N-vinylphthalimide, N-vinylsuccinimide, vinyl thiolacetate, methyl alpha-chloroacrylate, vinyl ethinyl carbinols, and N-vinylcarbazole.

The aforesaid compounds are effectively polymerized either alone to produce homopolymers or in admixture with one or more of said vinylidene compounds to produce copolymers.

In addition any other monomeric monethylenic compound having a molecular weight greater than 30 in which the sole aliphatic carbon-to-carbon unsaturation is the ethylenic double bond can be employed singly or admixed with other such compounds in the instant process as interpolymerization modifiers to bring about the production of many valuable products even though many such monoethylenic compounds either fail to polymerize or polymerize only to a limited extent or extremely slowly in the presence of oxygen-liberating catalysts according to prior art processes. It is essential to this invention, however, that one of the members of the mixture of monomeric monethylenic compounds subjected to polymerization according to this invention should be a polymerizable vinylidene compound having a molecular weight greater than 30 in which the sole aliphatic carbon-to-carbon unsaturation is the double bond in the vinylidene radical. Among examples of monomeric monoethylenic compounds, other than the aforesaid vinylidene compounds, adapted for use as modifiers in this invention may be mentioned fumaric esters, such as methyl fumarate and ethyl fumarate, maleic esters, such as propyl and butyl maleates, mesaconic esters, such as amyl and hexyl mesaconates, citraconic esters such as methyl and amyl citraconates, N-vinylmaleimide, olefin hydrocarbons, such as 2-butene, and trichlorethylene.

The most important classes from the industrial standpoint of polymerizable monethylenic monomeric vinylidene compounds having a molecular weight greater than 30 in which the sole aliphatic carbon-to-carbon unsaturation is the double bond in the vinylidene radical are:

(1) The vinyl esters of saturated monocarboxylic acids, e. g., vinyl formate, vinyl acetate, vinyl propionate, vinyl stearate and the like;

(2) The vinyl halides, such as vinyl fluoride, vinyl chloride, vinyl bromide and vinyl iodide;

(3) The esters of alpha, beta-unsaturated monocarboxylic acids in which said alpha,beta-unsaturation is a terminal double bond and is the sole aliphatic carbon-to-carbon unsaturation, such as methyl acrylate, ethyl acrylate, propyl acrylate, methyl methacrylate, methyl alpha-chloroacrylate and the like; and (4) The alpha,beta-unsaturated nitriles in which said alpha,beta-unsaturation is a terminal double bond and is the sole aliphatic carbon-to-carbon unsaturation, such as acrylonitrile, methacrylonitrile and the like.

This invention is, therefore, of particular importance as regards the polymerization of monomers belonging to the aforesaid classes and of mixtures of such monomers.

In preparing copolymers, according to this invention, of one or more polymerizable monoethylenic monomeric vinylidene compounds having a molecular weight greater than 30 in which the sole aliphatic carbon-to-carbon unsaturation is the double bond in the vinylidene group with one or more other monoethylenic monomers having a molecular weight greater than 30 in which the sole aliphatic carbon-to-carbon unsaturation is the ethylenic double bond, it is essential that the ratio by weight of vinylidene compound to other monoethylenic monomer in the reaction mixture shall be at least 5:95.

In preparing copolymers of polymerizable monoethylenic monomeric vinylidene compounds having a molecular weight greater than 30 in which the sole aliphatic carbon-to-carbon unsaturation is the double bond in the vinylidene group, in the absence of other monoethylenic monomers, optimum results are obtained when at least one such vinylidene compound is present in the reaction mixture in an amount at least equal to 5% of the total weight of vinylidene reactants.

The relative proportions of the monomer phase and the aqueous phase in the aqueous systems of this invention are not necessarily fixed within rigid limits. However, practically speaking, superior results are obtained with mixtures in which the ratio of the aqueous to the non-aqueous phase is within the range of from 0.9:1 to 10:1. In large scale operations, particularly, optimum results are obtained when the aforesaid ratio is within the range of from 1:1 to 4:1.

It is within the scope of this invention to employ aqueous mixtures produced merely by agitation of the monomer phase with the aqueous phase before or during the polymerization period. It is not essential to this invention that dispersing agents be employed. However, the formation of more or less stable dispersions can be accomplished more readily through the agency of added dispersing agents, so that in many instances it is desirable to use a dispersant. The choice of dispersing agent will depend largely upon the properties of the monomers to be polymerized or the pH of the aqueous medium. For example, the invention contemplates conducting the polymerization in neutral, acid or alkaline aqueous media. In neutral dispersions there may be used neutral dispersing agents of the type represented by polyvinyl alcohol, agar-agar, gelatin, methylated starch, sodium polymethacrylate, or the modified polymeric dispersing agents derived from ethylene oxide. In alkaline media, it is preferable to use dispersing agents of the type represented by alkali metal or amine soaps of long chain fatty acids, for example, sodium oleate, potassium laurate, or triethanolamine stearate. When dispersing agents are employed in acid media, it is essential that they be stable and will not decompose at pH values below 7. The preferred agents are the synthetic dispersants comprising the soluble salts of long chain alkyl sulfates and sulfonates. Examples of this class are sodium cetyl sulfate, the sodium salt of sulfonated paraffin white oil, and the sodium salt of sulfonated oleyl acetate. A wide variety of other dispersing agents falling within this broad class are also suitable for use in emulsifying the monomers of the invention in acid media. Hence, by selecting appropriate dispersing agents, the process of the invention can be conducted at pH values ranging from 1 to about 11. In the case of many monomers, however, superior polymers result when there are employed pH values in the range of about 3 to 5 and a dispersing agent which is stable under these conditions of mild acidity.

As hereinbefore stated the process of this invention is applicable to a wide variety of monoethylenic compounds. Furthermore, the ratio of aqueous to non-aqueous phases in the reaction mixture may be varied over relatively wide limits; and dispersing agents may be employed or not (while the use of dispersing agents may be desirable in certain instances, it is not essential to the successful operation of the process of this invention). It is, however, critical to this invention that there be employed a specific catalyst system, namely, an oxygen-liberating peroxy catalyst, of the type long known to be effective in vinyl polymerizations, in combination with a sulfinic acid or an alkali metal salt thereof. As typical peroxy catalysts may be mentioned hydrogen peroxide, benzoyl peroxide, diethyl peroxide, the alkali salts of percarbonic and perboric acid, and the soluble salts of perdisulfuric acid, such as ammonium perdisulfate and the alkali perdisulfates such as sodium and potassium perdisulfates. Any sulfinic acid (i. e., any alkyl or aryl sulfinic acid) may be used. Included among examples of alkyl sulfinic acids are methane sulfinic acid, ethane sulfinic acid, propane-alpha sulfinic acid, 2-hydroxyethane sulfinic acid, 2-methylpropane sulfinic acid, ethane-1,2-disulfinic acid and the like; while among examples of aryl sulfinic acids are benzenesulfinic acid, alpha-naphthalene sulfinic acid, beta-naphthalene sulfinic acid, diphenyl sulfinic acid, camphane sulfinic acid and the like. The acids themselves may be used, but it is often preferable to use their alkali metal salts, e. g., their sodium, potassium, lithium, rubidium or cesium salts, which are more soluble in water. A particularly effective agent is formamidine sulfinic acid which is produced by hydrogen peroxide oxidation of thiourea. The alkyl and aryl sulfinic acids are made by known methods, for example, by reduction of the corresponding sulfonyl chlorides.

The amount of peroxy catalyst may be varied within relatively wide limits. Substantial results are obtained when the amount used is as low as 0.01% based on the total weight of monoethylenic monomer and also when it is as high as 5% or more. The amount actually used in any specific polymerization will, of course, depend upon the polymerization aptitude of the monomers, polymerization temperature and other factors which have an important bearing on the course of the reaction. In general it is best to use the least amount of peroxy compound that will bring about a satisfactory rate of polymerization in a given type of equipment. Superior results are obtained with an amount of peroxy compound within the range of from 0.1% to 4%, and optimum results with an amount within the range of from 0.1% to 2% based on the weight of monoethylenic monomer.

Similarly the amount of sulfinic acid or salt thereof used in this invention may be varied within relatively wide limits. Substantial results are obtained when the amount employed is as low as 0.001% based on the total weight of monoethylenic monomer present and when it is as high as 5% or more. Superior results are obtained when the sulfinic acid or salt thereof is employed in an amount within the range of from 0.05% to 0.5% based on the total weight of monoethylenic monomer.

The ratio of peroxy compound to sulfinic compound employed has an important bearing on the rate of polymerization of the monomers and in almost every case this ratio must be adjusted carefully for maximum efficiency. In order to provide optimum rates of polymerization and products having optimum properties, the ratio by weight of the peroxy compound to sulfinic acid or salt thereof in the reaction mixture should be within the range of from 0.5:1 to 10:1. Frequently, the addition of the sulfinic acid or salt thereof to the reaction mixture all at once is attended by a vigorous reaction as evidenced by a sharp increase in temperature and in such cases the sulfinic acid or its salt may be added portionwise to the reaction mixture during the course of the polymerization to prevent the occurrence of undesirable fluctuations in temperature.

Broadly speaking polymerization may be conducted according to this invention at temperatures ranging from just above the freezing point of the dispersion, i. e., 0° C., to temperatures of 125° C. and above, provided suitable adjustments are made in the aqueous phase-monomer phase ratio, the concentration of the dispersing agent, if any is used, and the concentration of peroxy catalyst and sulfinic compound.

Depending upon the conditions employed in the polymerization, the polymers are obtained either as dispersions in water or as finely divided suspensions. In either case, the polymers may be isolated as finely divided powders by a variety of methods. For example, polymers prepared in the absence of added dispersing agents may be recovered by a simple filtration process followed by washing and drying in an appropriate equipment. On the other hand, if effective dispersing agents are employed, the resulting permanent dispersion can be coagulated by freezing, by the addition of suitable electrolytes or by spraying the dispersion into a heated and/or evacuated chamber. Generally speaking, the most satisfactory technique involves adding an appropriate amount of an electrolyte to bring about coagulation of the polymers at a temperature just below the point where the precipitated polymers tend to cohere. This procedure yields a granular product which is readily washed. Suitable electrolytes are sodium chloride, sodium sulfate, mineral acids, calcium chloride, inorganic nitrates, and aluminum sulfate. The washing and drying operation may be carried out by any of the procedures known to the art.

In conducting the polymerization of ethylenic compounds in aqueous systems according to methods of the prior art, it often happens that the presence of oxygen may have a retarding effect on the speed of polymerization. The effect of oxygen is minimized to a considerable extent in the process of the present invention, although in some cases it is desirable to displace air from the polymerization vessel by means of an inert gas, such as nitrogen, carbon dioxide, methane or helium. The air may be removed by a simple flushing process or by repeatedly introducing the inert gas under pressure and purging until the last traces of oxygen originally present are substantially eliminated.

The use of the combination of peroxy compound and sulfinic compound according to this invention results in the polymerization of monoethylenic monomers either singly or in combination in a much shorter time with smaller proportions of catalyst than by the methods of the prior art. For example, many polymerizations which require 4 to 20 hours according to the prior art methods can be accomplished within 15 minutes to one hour by using the combination of peroxy catalyst with a sulfinic compound. This represents an important saving through increasing several-fold the amount of product that can be manufactured in a single unit of equipment within a given period of time. Moreover, many copolymer systems react with difficulty according to the methods of the prior art. The present invention not only provides a technique for conducting conventional copolymerizations at an extremely rapid rate, but also facilitates the polymerization of the more refractory systems at a practicable rate.

The instant invention not only provides more rapid polymerization rates with smaller quantities of catalysts; it also results in polymers of superior quality. For instance, copolymers had according to this invention are more homogeneous, more transparent and have higher softening points than corresponding prior art copolymers.

The products prepared according to the present invention may be used in moulded plastics, coatings, films, foils, fibers and adhesives. For any of these purposes the polymer may be formed separately and thereafter combined with, or may be prepared in the presence of, plasticizers, stabilizers, fillers, pigments, dyes, softeners, natural resins or synthetic resins. In the event the products had according to this invention are to be used as coatings or impregnating agents for porous materials, it is often practical to apply the poylmerized aqueous mixture directly to the material to be coated without the intermediate isolation of the polymer.

As many apparently widely different embodiments of this invention may be made without departing from the spirit and scope thereof, it is to be understood that it is not limited to the specific embodiments thereof except as defined in the appended claims.

Having described the present invention, the following is claimed as new and useful:

1. In a process of polymerizing monoethylenic monomers having a molecular weight greater than 30 in which the sole aliphatic carbon-to-carbon unsaturation is the ethylenic double bond and of which not less than 5% by weight is a polymerizable vinylidene compound having a molecular weight greater than 30 in which the sole aliphatic carbon-to-carbon unsaturation is the double bond in the terminal vinylidene radical, the improvement which consists in subjecting from 5% by weight of vinylidene compound in admixture with another of said monoethylenic monomers to 100% by weight of said vinylidene compound, in an aqueous medium containing from 0.01% to 5% of an oxygen-yielding polymerization catalyst and from 0.001% to 5% of a member of the group consisting of sulfinic acids and alkali metals salts thereof, based on the total weight of monomer, to a temperature of from 0° C. to 125° C. until polymerization has taken place.

2. In a process of polymerizing polymerizable monoethylenic monomeric vinylidene compounds having a molecular weight greater than 30 in which the sole aliphatic carbon-to-carbon unsaturation is the double bond in the terminal vinylidene radical, the improvement which consists in subjecting from one to two of said monomers, in an aqueous medium containing from 0.01% to 5% of an oxygen-yielding polymerization catalyst and from 0.001% to 5% of a member of the group consisting of sulfinic acids and alkali metal salts thereof, based on the total weight of monomer, to a temperature of from 0° C. to 125° C. until polymerization has taken place.

3. In a process of polymerizing a mixture of polymerizable monoethylenic monomeric vinylidene compounds having a molecular weight greater than 30 in which the sole aliphatic carbon-to-carbon unsaturation is the double bond in the terminal vinylidene radical, the improvement which consists in subjecting two of said monomers, in an aqueous medium containing from 0.01% to 5% of an oxygen-yielding polymerization catalyst and from 0.001% to 5% of a member of the group consisting of sulfinic acids and alkali metal salts thereof, based on the total weight of monomer, to a temperature of from 0° C. to 125° C. until polymerization has taken place.

4. In a process of polymerizing a polymerizable monoethylenic monomeric vinylidene compound having a molecular weight greater than 30 in which the sole aliphatic carbon-to-carbon unsaturation is the double bond in the terminal vinylidene radical, the improvement which consists in subjecting said vinylidene compound, in an aqueous medium containing from 0.01% to 5% of an oxygen-yielding polymerization catalyst and from 0.001% to 5% of a member of the group consisting of sulfinic acids and alkali metal salts thereof, based on the total weight of the vinylidene compound, to a temperature of from 0° C. to 125° C. until polymerization has taken place.

5. A process according to claim 4 wherein the aqueous medium contains from 0.1% to 4% of oxygen-yielding polymerization catalyst and from 0.05% to 0.5% of a member of a group consisting of sulfinic acids and alkali metal salts thereof based on the total weight of the vinylidene compound and the ratio of the aqueous to the non-aqueous phase is within the range of from 0.9:1 to 10:1.

6. A process according to claim 4 wherein the aqueous medium contains from 0.1% to 2% of an oxygen-yielding polymerization catalyst and from 0.05% to 0.5% of a sulfinic compound of the group consisting of sulfinic acids and alkali metal salts thereof based on the total weight of the vinylidene compound, the ratio of said peroxy compound to said sulfinic compound being within the range of from 0.5:1 to 10:1 and the ratio of the aqueous to the non-aqueous phase being within the range of from 1:1 to 4:1.

7. In a process of polymerizing an ester of an alpha, beta-unsaturated monocarboxylic acid in which said alpha,beta-unsaturation is a terminal double bond and is the sole aliphatic carbon-to-carbon unsaturation, the improvement which consists in subjecting said ester in an aqueous medium containing from 0.01% to 5% of an oxygen-yielding polymerization catalyst and from 0.001% to 5% of a sulfinic compound of the group consisting of sulfinic acids and alkali metal salts thereof, based on the total weight of said ester, to a temperature of from 0° C. to 125° C. until polymerization has taken place, the ratio of oxygen-yielding polymerization catalyst to sulfinic compound in the reaction mixture being within the range of from 0.5:1 to 10:1 and the ratio of the aqueous to the non-aqueous phase in the said mixture being within the range of from 0.9:1 to 10:1.

8. A process according to claim 7 wherein the ester is methyl methacrylate, the oxygen-yielding polymerization catalyst is hydrogen peroxide, the sulfinic compound is sodium p-toluenesulfinate and the ratio of the aqueous to the non-aqueous phase in the reaction mixture is within the range of from 1:1 to 4:1.

9. In a process of polymerizing a vinyl ester of a saturated monocarboxylic acid the improvement which consists in subjecting said vinyl ester in an aqueous medium containing from 0.01% to 5% of an oxygen-yielding polymerization catalyst and from 0.001% to 5% of a sulfinic compound of the group consisting of sulfinic acids and alkali metal salts thereof, based on the total weight of the vinyl ester, to a temperature of from 0° C. to 125° C. until polymerization has taken place, the ratio of oxygen-yielding polymerization catalyst to sulfinic compound in the reaction mixture being within the range of from 0.5:1 to 10:1 and the ratio of the aqueous to the non-aqueous phase in the said mixture being within the range of from 0.9:1 to 10:1.

10. In a process of polymerizing vinyl acetate the improvement which consists in subjecting said compound in an aqueous medium containing from 0.1% to 2% of hydrogen peroxide and from 0.05% to 0.5% of formamidine sulfinic acid, based on the total weight of the vinyl acetate, to a temperature of from 0° C. to 125° C. until polymerization has taken place, the ratio of hydrogen peroxide to formamidine sulfinic acid in the reaction mixture being within the range of from 0.5:1 to 10:1 and the ratio of the aqueous to the non-aqueous phase in the said mixture being within the range of from 0.9:1 to 4:1.

11. In a process of polymerizing an alpha,beta-unsaturated nitrile in which said alpha,beta-unsaturation is a terminal double bond and is the sole aliphatic carbon-to-carbon unsaturation, the improvement which consists in subjecting said nitrile in an aqueous medium containing from 0.01% to 5% of an oxygen-yielding polymerization catalyst and from 0.001% to 5% of a sulfinic compound of the group consisting of sulfinic acids and alkali metal salts thereof, based on the total weight of the nitrile, to a temperature of from 0° C. to 125° C. until polymerization has taken place, the ratio of the oxygen-yielding polymerization catalyst to sulfinic compound in the reaction mixture being within the range of from 0.5:1 to 10:1 and the ratio of the aqueous to the non-aqueous phase in the said mixture being within the range of from 0.9:1 to 10:1.

12. In a process of polymerizing acrylonitrile the improvement which consists in subjecting said compound in an aqueous medium containing from 0.1% to 2% of ammonium perdisulfate and from 0.05% to 0.5% of sodium p-toluenesulfinate, based on the total weight of the acrylonitrile, to a temperature of from 0° C. to 125° C., until polymerization has taken place, the ratio of ammonium perdisulfate to sodium p-toluenesulfinate in the reaction mixture being within the range of from 0.5:1 to 10:1 and the ratio of the aqueous to the non-aqueous phase in the said mixture being within the range of from 1:1 to 4:1.

WINIFRED M. JACOBSON.
*Executrix of the Estate of Ralph Albert Jacobson, Deceased.*

REFERENCES CITED

The following references are of record in the file of this patent:

UNITED STATES PATENTS

| Number | Name | Date |
|---|---|---|
| 2,419,010 | Coffman et al. | Apr. 15, 1947 |